US007096469B1

(12) United States Patent
Kubala et al.

(10) Patent No.: US 7,096,469 B1
(45) Date of Patent: Aug. 22, 2006

(54) METHOD AND APPARATUS FOR ENFORCING CAPACITY LIMITATIONS IN A LOGICALLY PARTITIONED SYSTEM

(75) Inventors: Jeffrey P. Kubala, Poughquag, NY (US); Jeffrey M. Nick, West Park, NY (US); Peter B. Yocom, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 09/677,338

(22) Filed: Oct. 2, 2000

(51) Int. Cl.
*G06F 9/46* (2006.01)
(52) U.S. Cl. .................................................. 718/100
(58) Field of Classification Search ................ 709/100, 709/101, 102; 718/100–104
See application file for complete search history.

(56) References Cited

U.S. PATENT DOCUMENTS

| | | | | |
|---|---|---|---|---|
| 4,489,386 | A | * 12/1984 | Breddan | 700/291 |
| 4,937,863 | A | 6/1990 | Robert et al. | 380/4 |
| 5,390,297 | A | 2/1995 | Barber et al. | 395/200 |
| 5,671,412 | A | 9/1997 | Christiano | 395/615 |
| 5,754,763 | A | 5/1998 | Bereiter | 395/187.01 |
| 5,758,068 | A | 5/1998 | Brandt et al. | 395/186 |
| 6,021,438 | A | 2/2000 | Duvvoori et al. | 709/224 |
| 6,032,239 | A | * 2/2000 | Beelitz | 711/173 |
| 6,049,789 | A | 4/2000 | Frison et al. | 705/59 |
| 6,056,786 | A | 5/2000 | Rivera et al. | 795/712 |
| 6,438,704 | B1 | * 8/2002 | Harris et al. | 713/502 |
| 6,832,248 | B1 | * 12/2004 | Byrnes | 709/223 |

OTHER PUBLICATIONS

Pending IBM Application: "Management of a Concurrent Use License in a Logically-Partitioned Computer", U.S. Appl. No. 09/314,324, filed May 19, 1999 K. P. Stamschror et al.

Pending IBM Application: "License Management System",U.S. Appl. No. 09/342,555, filed Feb. 19, 1999 P. Baratti et al.

Pending IBM Application: "Multisystem Resource Capping", U.S. Appl. No. 08/848,763, filed May 1, 1997 B. R. Pierce et al.

* cited by examiner

*Primary Examiner*—Chun Cao
*Assistant Examiner*—Mark Connolly
(74) *Attorney, Agent, or Firm*—William A. Kinnaman, Jr.

(57) ABSTRACT

A method and apparatus for enforcing capacity limitations such as those imposed by software license agreements in an information handling system in which a physical machine is divided into a plurality of logical partitions, each of which is allocated a defined portion of processor resources by a logical partition manager. A software license manager specifies a maximum allowed consumption of processor resources by a program executing in one of the logical partitions. A workload manager also executing in the partition measures the actual consumption of processor resources by the logical partition over a specified averaging interval and compares it with the maximum allowed consumption. If the actual consumption exceeds the maximum allowed consumption, the workload manager calculates a capping pattern and interacts with the logical partition manager to cap the actual consumption of processor resources by the partition in accordance with the calculated capping pattern. To provide additional capping flexibility, partitions are assigned phantom weights that the logical partition manager adds to the total partition weight to determine whether the partition has exceeded its allowed share of processor resources for capping purposes. The logical partition thus becomes a "container" for the licensed program with an enforced processing capacity less than that of the entire machine.

24 Claims, 6 Drawing Sheets

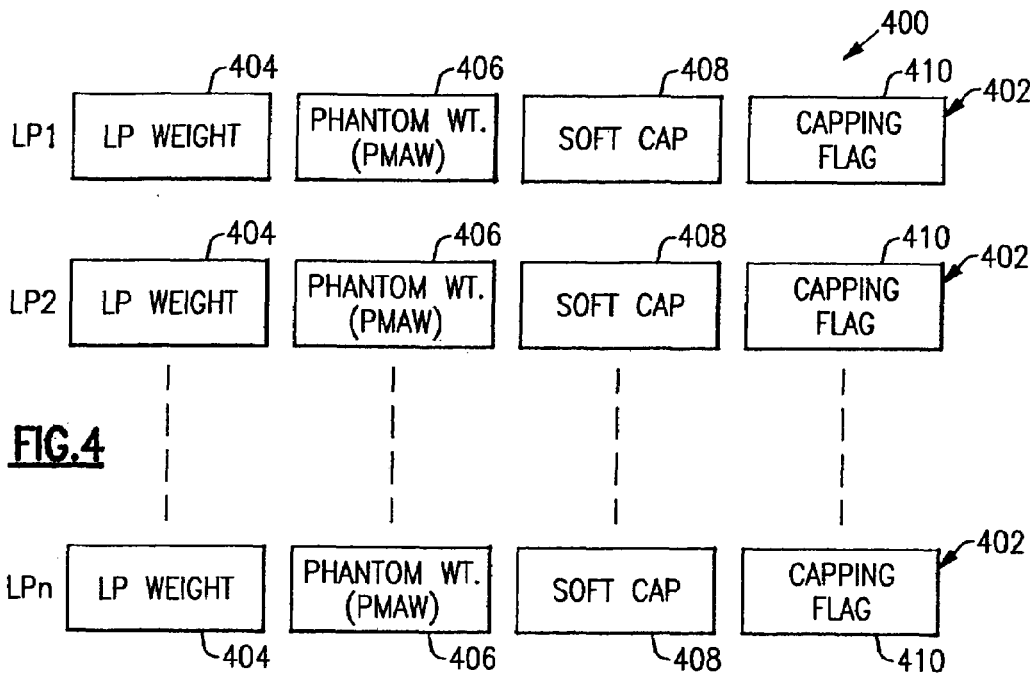
FIG.4
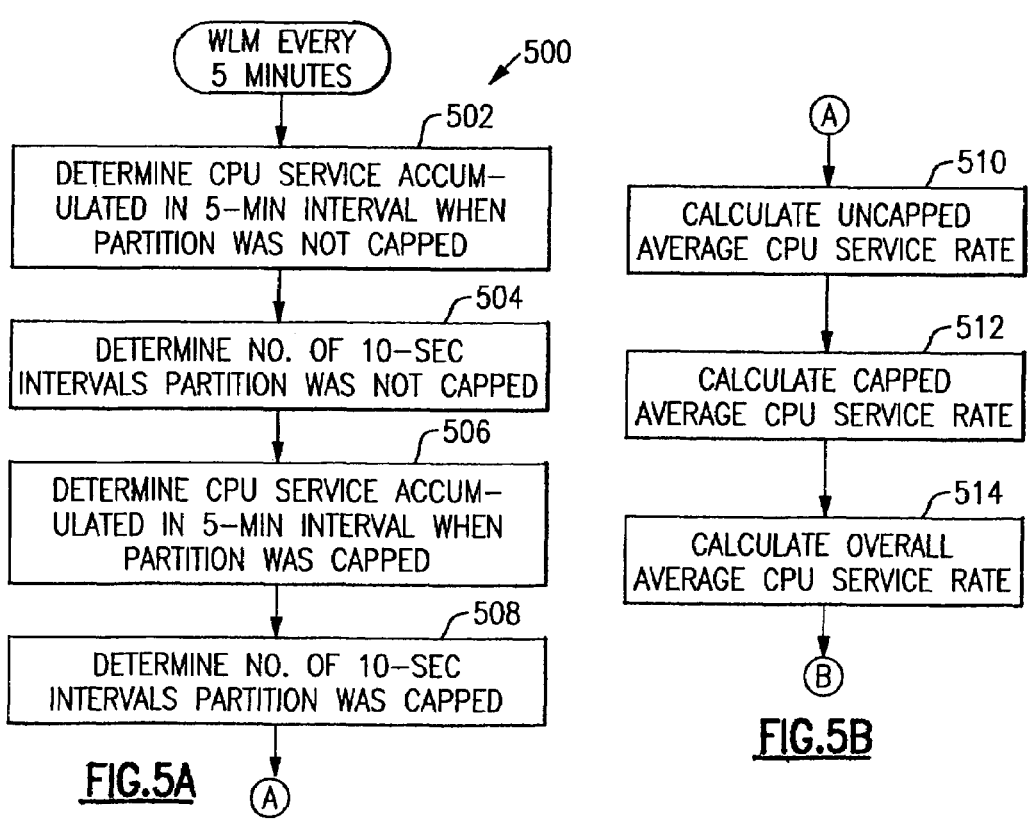
FIG.5A
FIG.5B

METHOD AND APPARATUS FOR ENFORCING CAPACITY LIMITATIONS IN A LOGICALLY PARTITIONED SYSTEM

BACKGROUND OF THE INVENTION

1. Field of the Invention

This invention relates to a method and apparatus for enforcing capacity limitations in a logically partitioned information handling system and, more particularly, to a method and apparatus for enforcing such capacity limitations in accordance with those imposed by the terms of a software program license agreement.

2. Description of the Related Art

As indicated above, this invention relates to the enforcement of capacity limitations, such as those imposed by a program license agreement, in a logically partitioned system. As a preliminary to discussing the problems that are addressed by the invention, a brief discussion of logically partitioned systems and existing methods of resource and workload management is in order.

Logical partitioning is a concept that originated on a predecessor to the current IBM S/390 computer hardware platform. Today, many S/390 hardware machines operate in what is known as logically partitioned (LPAR) mode, in which the physical resources of the machine are partitioned to form a plurality of logical machines called logical partitions. More particularly, each logical partition appears to programming running in the partition as a logical machine that is similar in behavior to the actual physical machine, but has a subset of that machine's resources.

Logical partitioning allows the establishment of a plurality of system images within a single physical central electronics complex (CEC), or central processor complex (CPC) as it is alternatively called. Each system image is capable of operating as if it were a separate computer system. That is, each logical partition can be independently reset, initially loaded with an operating system that may be different for each logical partition, and operate with different software programs using different input/output (I/O) devices. Logical partitioning is in common use today because it provides its users with flexibility to change the number of logical partitions in use and the amount of physical system resources assigned to each partition, in some cases while the entire central processor complex continues to operate.

Logically partitioned computer systems are well known in the art and are described in U.S. Pat. No. 4,564,903 (Guyette et al.), U.S. Pat. No. 4,843,541 (Bean et al.), and U.S. Pat. No. 5,564,040 (Kubala), incorporated herein by reference. Commercial embodiments of logically partitioned systems include IBM S/390 processors with the Processor Resource/Systems Manager™ (PR/SM™) feature and described, for example, in the IBM publication Processor Resource/Systems Manager Planning Guide, GA22-7236-06, June 2000, incorporated herein by reference.

Workload management is a concept whereby units of work (processes, threads, etc.) that are managed by an operating system are organized into classes (referred to as service classes or goal classes) that are provided system resources in accordance with how well they are meeting predefined goals. Resources are reassigned from a donor class to a receiver class if the improvement in performance of the receiver class resulting from such reassignment exceeds the degradation in performance of the donor class, i.e., there is a net positive effect in performance as determined by predefined performance criteria. Workload management of this type differs from the conventional resource management performed by most operating systems in that the assignment of resources is determined not only by its effect on the work units to which the resources are reassigned, but also by its effect on the work units from which they are taken.

Workload managers of this general type are disclosed in the following commonly owned patents, pending patent applications and non-patent publications, incorporated herein by reference:

U.S. Pat. No. 5,504,894 to D. F. Ferguson et al., entitled "Workload Manager for Achieving Transaction Class Response Time Goals in a Multiprocessing System";

U.S. Pat. No. 5,473,773 to J. D. Aman et al., entitled "Apparatus and Method for Managing a Data Processing System Workload According to Two or More Distinct Processing Goals";

U.S. Pat. No. 5,537,542 to C. K. Eilert et al., entitled "Apparatus and Method for Managing a Server Workload According to Client Performance Goals in a Client/Server Data Processing System";

U.S. Pat. No. 5,603,029, to J. D. Aman et al., entitled "System of Assigning Work Requests Based on Classifying into an Eligible Class Where the Criteria Is Goal Oriented and Capacity Information is Available";

U.S. application Ser. No. 08/383,168, filed Feb. 3, 1995, of C. K. Eilert et al., entitled "Apparatus and Method for Managing a Distributed Data Processing System Workload According to a Plurality of Distinct Processing Goal Types", now U.S. Pat. No. 5,675,739;

U.S. application Ser. No. 08/383,042, filed Feb. 3, 1995, of C. K. Eilert et al., entitled "Multi-System Resource Capping", abandoned in favor of U.S. application Ser. No. 08/848,763, filed May 1, 1997, now U.S. Pat. No. 6,442,583;

U.S. application Ser. No. 08/488,374, filed Jun. 7, 1995, of J. D. Aman et al., entitled "Apparatus and Accompanying Method for Assigning Session Requests in a Multi-Server Sysplex Environment", now U.S. Pat. No. 6,249,800;

MVS Planning: Workload Management, IBM publication GC28-1761-00, 1996;

MVS Programming: Workload Management Services, IBM publication GC28-1773-00, 1996.

Of the patents, U.S. Pat. Nos. 5,504,894 and 5,473,773 disclose basic workload management systems; U.S. Pat. No. 5,537,542 discloses a particular application of the workload management system of U.S. Pat. No. 5,473,773 to client/server systems; U.S. Pat. Nos. 5,675,739 and 6,442,583 disclose particular applications of the workload management system of U.S. Pat. No. 5,473,773 to multiple interconnected systems; U.S. Pat. No. 5,603,029 relates to the assignment of work requests in a multi-system complex ("sysplex"); and U.S. Pat. No. 6,249,800 relates to the assignment of session requests in such a complex. The two non-patent publications describe an implementation of workload management in the IBM® OS/390™ (formerly MVS®) operating system.

Recent logical partition clustering technology combines aspects of logical partition management and workload management. As described in the copending application of applicants J. P Kubala et al., Ser. No. 09/407,391, filed Sep. 28, 1999, and incorporated herein by reference, in one mode of operation LP manager 106 manages logical partitions 108 as groups referred to herein as LP clusters (LPCs), or simply clusters. A cluster may comprise all of the logical partitions 108 on a particular machine 102, a subset of the partitions 108 on a particular machine 102, or even partitions 108 from different machines 102. LP manager 106 may assign a specified amount of a machine resource (such as shared CPU capacity, in the case of the present invention) to a cluster as a whole. The cluster would be limited to that specified amount in the presence of resource contention, but would potentially be able to use an additional amount of such resource in the absence of contention.

In addition to allocating a share of machine resources to a cluster as a whole, LP manager 106 is capable, in this mode of operation, of allocating resources among the logical partitions 108 making up a cluster in accordance with logical partition weights that are assigned to the respective partitions. As an example of this weighting, consider an LP cluster that consists of four logical partitions (LP1–LP4) and has available to it a total CPU capacity of 400 MIPS (millions of instructions per second). Assume that LP1–L4 are assigned respective weights of 20, 30, 40 and 10, for a total cluster weight of 100. In this example, if there is CPU contention, then partitions LP1–LP4 are allowed to run at respective capacities of 80 MIPS, 120 MIPS, 160 MIPS and 40 MIPS, for a total capacity equal to the cluster capacity of 400 MIPS.

With this background, the problem addressed by the present invention can be discussed. Primarily, it relates to the manner in which software for server platforms such as S/390 is licensed. Today much of S/390 software, both IBM software and vendor software, is priced based on the size of the physical machine on which it runs. An application that is run on a machine (references here to "machines" are to physical machines) with one central processor unit (CPU) is less expensive than the same application run on a machine with 10 CPUs. The price is independent of the amount of work actually done by the application.

This pricing scheme can cause end users to build less than optimal configurations to lower software costs. For example, if a user wanted to start a small-scale experiment with a new software product, the user might bring in a small machine to run this new product instead of running it on an existing large machine to keep the software price down. This entails the additional management overhead of dealing with another machine and does not allow the installation to take advantage of the logical partition clustering technology referred to above. These problems are aggravated by the fact that the sizes of S/390 machines are growing faster than many customer workloads.

To state it somewhat differently, today on the S/390 platform software is most often licensed to an entire machine. With the pricing of most software being based on the total capacity of the machine on which it runs (typically expressed as millions of instructions per second, or MIPS), increasing the capacity of a machine drives up a user's software licensing costs. If a given program product is used across the entire capacity of the machine, this is not necessarily a bad proposition or model for the end user or the vendor. However, if a program product is meant to be used on a portion of the machine, in a logical partition, having to license that product to the entire capacity of the machine is an expensive undertaking.

Part of the strength of the S/390 platform is its ability to run multiple, diverse workloads in multiple logical partitions to make efficient use of the hardware resources. In attempting to move new workloads (such as UNIX based applications and Web servers) onto the S/390 platform, it would be desirable to be able to add these new workloads to existing machines alongside existing applications and corporate databases that already reside on S/390. However, with machine-based software pricing, the entry cost into the S/390 world for these workloads is not cost competitive with alternate platforms.

SUMMARY OF THE INVENTION

The present invention contemplates a method and apparatus for enforcing capacity limitations such as those imposed by software license agreements in an information handling system in which a physical machine is divided into a plurality of logical partitions, each of which is allocated a defined portion of processor resources by a logical partition manager. Each logical partition can be given a processor resource limit. A software license manager verifies that programs executing in each logical partition are licensed to at least the capacity limit of that partition. A workload manager also executing in the partition measures the actual consumption of processor resources by the logical partition over a specified averaging interval and compares it with the maximum allowed consumption. If the actual consumption exceeds the maximum allowed consumption, the workload manager calculates a capping pattern and interacts with the logical partition manager to cap the actual consumption of processor resources by the partition in accordance with the calculated capping pattern. To provide additional capping flexibility, partitions are assigned phantom weights that the logical partition manager adds to the total partition weight to determine whether the partition has exceeded its allowed share of processor resources for capping purposes. The logical partition thus becomes a "container" for the licensed program with an enforced processing capacity (upon which the software pricing is based) less than that of the entire machine.

With a logical partition-based pricing scheme rather than a machine-based scheme, the entry cost of software for a workload on S/390 only has to reflect a subset of the capacity of the machine, not the entire machine. This allows the addition of workloads to S/390 machines at minimal cost, especially when one considers the benefits of workload balancing and management that logical partition clusters can deliver. The net result will allow workloads that would otherwise be on external boxes with much unused capacity to now be added to S/390 machines with more purchased total capacity than before.

The present invention exploits the ability of the workload manager (WLM) component of OS/390 to monitor the consumption of CPU resources for a logical partition. WLM compares the actual CPU resource consumption against some specified capacity limit for the logical partition. When a logical partition exceeds its capacity limit, WLM throttles the logical partition back to its capacity limit.

Preferably, the actual monitoring of the logical partition allows for peaks in the workload to occur beyond the licensed capacity. This is preferably done by calculating a rolling average utilization across a suitable time interval. For example, an interval of 4 hours is long enough to provide for capacity needs during temporary workload spikes, but short enough to prevent "gaming" across shift changes. The software is thus licensed to an average peak capacity rather than to an instantaneous peak capacity.

WLM monitors the total consumption of the CPU resources in a logical partition, not the resource usage by individual program products. The operating system (e.g., OS/390) running in the logical partition thus becomes a "container" for an amount of licensed and managed capacity. A licensed program is licensed for that size container (or more), and WLM ensures that the container size is maintained. The customer may, for example, buy a certificate (i.e., a document that is digitally signed by a certificate authority) for some amount of processor capacity for each software application. Preferably, a new application referred to herein as a license manager communicates with WLM and with the licensed programs to determine what can run and what cannot. The license manager is responsible for any actions that have to be taken for exceptions.

The container management is done by WLM in conjunction with the logical partition manager. The throttling mechanism utilizes the logical partition clustering technology described in the copending application of applicants J. P Kubala et al., Ser. No. 09/407,391, referred to above for CPU management to turn capping on and off in the logical partition if and when that logical partition exceeds its licensed capacity over the rolling average period. Capping is applied and removed in an alternating fashion so that the work in the logical partition does not come to a screeching halt; very much like anti-lock brakes.

In the present invention, relative logical partition weights are what are used to implement capping. The primary purpose of logical partition weights is to establish dispatching priorities of logical partitions when there is contention for CPU resources. Turning capping on prevents the logical partition from exceeding the portion of resources that result from such a partition weight.

BRIEF DESCRIPTION OF THE DRAWINGS

FIG. 4 shows logical partition parameters used by the logical partition manager of the present invention.

FIGS. 5A–5C show the procedure performed by the workload manager of the present invention to determine whether capping should be applied.

DESCRIPTION OF THE PREFERRED EMBODIMENT

Figure 1:
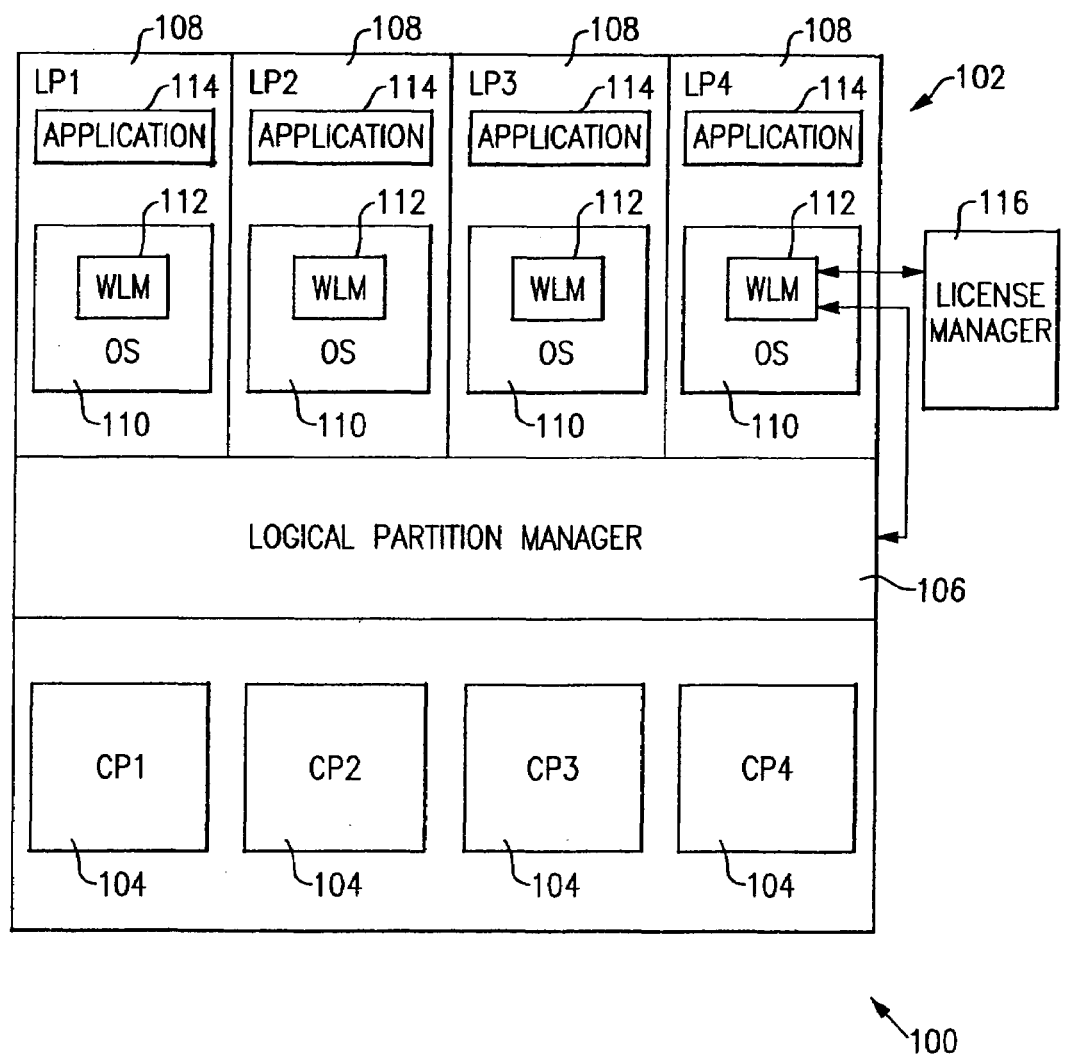
FIG. 1 shows an information handling system incorporating the present invention.

FIG. 1 shows an information handling system 100 incorporating the present invention. System 100 comprises a central electronics complex (CEC), or physical machine, 102 containing a plurality of central processors (CPs) 104, an exemplary four of which (CP1–CP4) are shown. Although not shown in FIG. 1, machine 102 also contains other conventional elements of a computer system, including memory and connections to input/output (I/O) peripherals such as direct access storage devices (DASD) and the like. A logical partition (LP) manager 106 partitions the physical machine 102 into a plurality of logical machines called logical partitions (LPs) 108, an exemplary four of which (LP1–LP4) are shown. Executing in each logical partition 108 is an operating system (OS) 110, containing a component 112 called workload manager (WLM), and one or more applications (APP) 114. Each operating system 110 performs the usual functions of providing system services and managing resources for applications 114 executing thereon. Each WLM 112 manages the allocation of resources within its partition 108 to workloads within various defined service classes.

From a logical viewpoint, each logical partition 108 appears to the operating system 110 and applications 114 executing therein as a separate physical machine, hence the term logical machine. (In general, references herein to a "machine" are to the physical machine 102 unless otherwise specified.) The operating system 100 on each logical partition 108 represents a separate system image, hence the partitions may be alternatively referred herein to as systems or images. Each logical partition 108 has a share of the physical resources of the machine that is specified by the logical partition manager 106, as described below. Thus, each logical partition 108 has one or more logical processors (not separately shown), each of which corresponds to either a share of a physical processor 104 (if the physical processor is being shared among partitions) or an entire physical processor (if the physical processor is dedicated to that partition).

Although the present invention is not limited to any particular platform, machine 102 may comprise an IBM S/390 server or follow-on machine, while logical partition manager 106 may comprise the Processor Resource/System Manager (PR/SM) feature of machine 102. OS 110 may comprise the IBM OS/390 operating system or a follow-on operating system.

Information handling system 100 comprises a license manager 116, a software application that may execute in one of the partitions 108 or in a separate partition or machine.

License manager 116 communicates with WLMs 112 to understand the capacity available to a given partition 108. When a software product (e.g., an application 114) whose license is being managed starts in a partition 108, the license manager 116 checks to see if the product is licensed for at least as much capacity as the partition's capacity (as managed by the present invention) plus the capacity of any other logical partitions 108 on the same machine 102 in which the product is already started. If the product is not within its license, license manager 116 either stops the product from starting or writes an exception record. License manager 116 also listens for notifications of changed capacity from a WLM 112. When license manager 116 receives such a notification, it validates that the running products are still within their licensed capacity. If they are not, license manager 116 writes an exception record.

As described in the copending application of applicants J. P Kubala et al., Ser. No. 09/407,391, filed Sep. 28, 1999, and incorporated herein by reference, in one mode of operation LP manager 106 manages logical partitions 108 as groups referred to herein as LP clusters (LPCs), or simply clusters. A cluster may comprise all of the logical partitions 108 on a particular machine 102, a subset of the partitions 108 on a particular machine 102, or even partitions 108 from different machines 102. LP manager 106 may assign a specified amount of a machine resource (such as shared CPU capacity, in the case of the present invention) to a cluster as a whole. The cluster would be limited to that specified amount in the presence of resource contention, but would potentially be able to use an additional amount of such resource in the absence of contention.

In addition to allocating a share of machine resources to a cluster as a whole, LP manager 106 is capable, in this mode of operation, of allocating resources among the logical partitions 108 making up a cluster in accordance with logical partition weights that are assigned to the respective partitions. As an example of this weighting, consider an LP cluster that consists of four logical partitions (LP1–LP4) and has available to it a total CPU capacity of 400 MIPS (millions of instructions per second). Assume that LP1–L4 are assigned respective weights of 20, 30, 40 and 10, for a total cluster weight of 100. In this example, if there is CPU contention, then partitions LP1–LP4 are allowed to run at respective capacities of 80 MIPS, 120 MIPS, 160 MIPS and 40 MIPS, for a total capacity equal to the cluster capacity of 400 MIPS.

As noted above, the partition weights by themselves only limit the resources available to a particular partition 108 in the presence of contention. To limit the use of resources by a partition even in the absence of contention, LP manager 106 has an additional mechanism known as capping. As described below, when LP manager applies capping to a partition 108, that partition's CPU usage is limited to an amount that is determined by its partition weight, even in the absence of contention.

FIG. 4 shows some of the logical partition parameters 400 used by the logical partition manager 106 of the present invention to control the individual partitions 108. These parameters consist of a set of entries 402 for each partition 108, including the logical partition weight 404, a "phantom weight" 406 to be described below, a "soft cap" 408 also to be described below, and a capping flag 410. Logical partition weight 404 specifies the relative amount of machine resources (in this case, CPU resources) that a logical partition 108 is entitled to in the presence of resource contention; that relative amount is equal to the ratio of the partition weight 404 of that partition 108 to the total partition weight of the partitions 108 making up the machine 102. Phantom weight 406 specifies an additional weight that is used in capping calculations in accordance with the present invention, as described below.

Soft cap 408 specifies a maximum capacity for the partition 108. The soft cap value 408 is specified as part of the definition of a logical partition 108. The units of the soft cap 408 are millions of unweighted CPU service units per hour (MSUs). (All references herein to CPU service units are to unweighted CPU service units.) A soft cap 408 can be specified for a partition 108 that has shared CPs and is not explicitly capped.

The soft cap 408 is based on CPU service units calculated using the MP factor for the number of physical CPs 104 on the machine 102. This is different from the CPU service calculation WLM 112 does, which uses an MP factor based on the number of logical CPs for the current partition 108. WLM 112 converts the service units it calculates to service units based on the number of physical CPs 104 for soft cap-related decisions.

Capping flag 410 specifies whether or not capping is on for that partition 108.

As a example of how capping operates in the present invention (without the phantom weight feature described below), consider a machine 102 with four logical partitions 108 (LP1–LP4) and a total CPU capacity of 1000 MIPS. Each partition 108 has a weight of 25, which guarantees each partition 250 MIPS in the presence of contention. Assume that partition LP1 licensed for 400 MIPS, that the workload on LP1 uses 450 MIPS if available (i.e., there is no contention from other partitions 108), and that the partition LP1 is uncapped. If 450 MIPS are available on the machine 102 (other partitions 108 are not using their full weight), LP1 must be capped 25% of the time at its weight equivalent (250 MIPS) to produce an average usage for the partition that is within the license limitation of 400 MIPS. The capping pattern that WLM 112 establishes in this example to achieve this 25% capping is 30 seconds capped followed by 90 seconds uncapped.

Figure 2A:
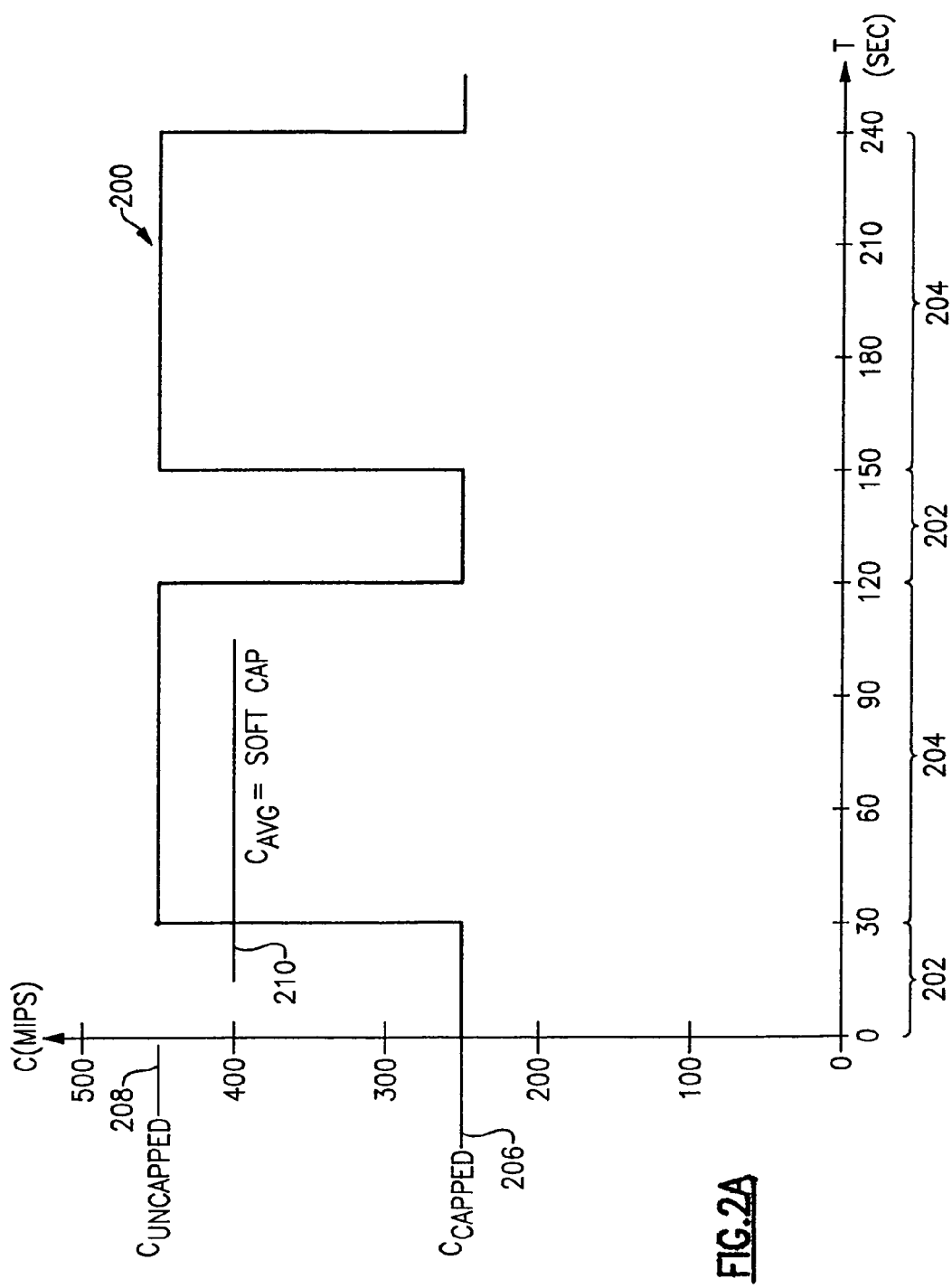
FIG. 2A shows a typical capping pattern of the present invention.

FIG. 2A shows the resulting capping pattern 200 of the CPU usage of LP1 over time. As shown in the figure, the CPU usage comprises capped intervals 202 alternating with uncapped intervals 204. In this particular example, each capped interval 202 is 30 seconds in length, while each uncapped interval 204 is 90 seconds in length. During each capped interval 202, LP1 runs at a capped capacity ($C_{capped}$) 206 of 250 MIPS, while during each uncapped interval 204, LP1 runs at an uncapped capacity ($C_{uncapped}$) 208 of 450 MIPS. Since in this particular example the capped intervals 202 make up 25% of the entire time interval, while the uncapped intervals 204 make up 75% of the entire time interval, the average CPU consumption ($C_{avg}$) 210 over the entire time interval is calculated as:

$$C_{avg} = 0.25 \times C_{capped} + 0.75 \times C_{uncapped} = 400 \text{ MIPS}$$

Figure 2B:
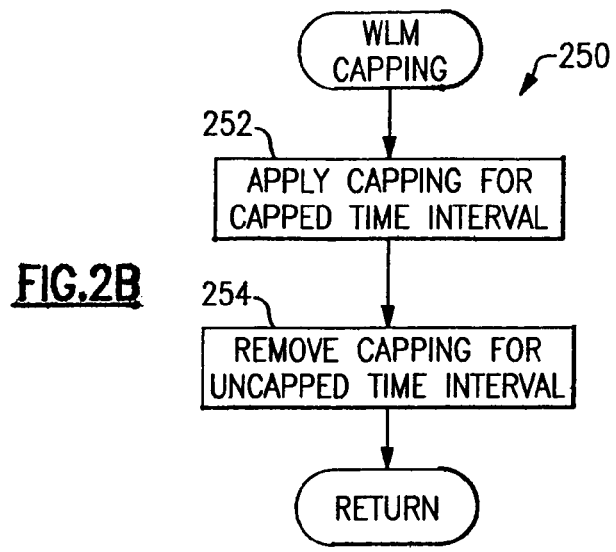
FIG. 2B shows the procedure performed by the workload manager to apply a capping pattern.

FIG. 2B shows the procedure 250 that WLM 112 performs to apply a capping pattern (such as the pattern 200) that it has calculated for a particular partition 108. In the capping procedure 250, WLM applies capping for the capped time interval 202, by issuing an instruction to the LP manager 106 to set the capping flag 410 to begin capping (step 252), then removes capping for the uncapped time interval 204, by issuing an instruction to the LP manager 106 to reset the capping flag 410 to end capping (step 254). This procedure 250 is repeated for as long as capping is to be applied in accordance with the pattern.

In the disclosed embodiment, WLM 112 has two basic roles in supporting partition-based pricing:

1. WLM 112 periodically calculates the potential CPU capacity available to a partition 108 so that it can be reported to license manager 116 if queried. WLM 112 also notifies license manager 116 when the capacity has changed.
2. WLM 112 polls the LP manager 106 to determine if a soft cap has been set or changed for the partition 108 (as indicated by a corresponding nonzero soft cap entry 408). When a soft cap is set for the partition 108 and its 4-hour average CPU usage goes above the soft cap, WLM 112 calculates a cap pattern and begins to cap the partition 108 (as described below).

The calculation of the potential CPU capacity depends on the configuration of the image. There are three cases:

1. The image is a logical partition 108 with a soft cap set. The potential capacity value returned is the value of the soft cap 408.
2. The image is either in basic mode or a non-capped logical partition 108. The potential capacity value returned is the number of CPs available to the image times the individual CP speed
3. The image is a capped logical partition. The potential capacity value returned is the smaller of case 2 and the CPU capacity represented by the partition's current logical partition weight.

One of the problems that the present invention addresses is that a conventional logical partition weight only has meaning in relationship to the weights of the other partitions 108 on the machine 102. (For the purposes of this discussion it is assumed that the LP cluster comprises the entire machine 102.) This implies that the range of soft cap values WLM 112 can support for a given partition 108 without additional function from LP manager 106 is limited based on this partition's weight and the weight of the other partitions 108 on the machine 102. A partition soft cap cannot be enforced if the soft cap represents less capacity than the capacity the partition's weight represents.

The simplest example of this issue is a machine 102 with a single partition 108. That partition's weight represents a 100% of the machine's capacity, so a soft cap cannot be used to limit the partition's capacity. This limitation is considered unacceptable because it significantly increases the complexity of using logical partition-based pricing. Whenever a user changes any partition's weight or adds capacity to his machine 102, the capacity represented by every partition's weight changes. This potentially makes the soft cap for some partition 108 unenforceable by WLM 112 and LP manager 106, resulting in the user's software products failing the license manager capacity checks.

To quantify this problem in a single-partition upgrade scenario, suppose that a single logical partition 108 is defined on a 400 MIPS machine 102 and that it has a licensed capacity of 400 MIPS. The logical partition 108 is defined with shared processors and a weight of 100. The partition 108 is defined this way in anticipation of a future workload being added. In this configuration, everything is fine. However, suppose that the end user wants to upgrade his machine 102 to a 500 MIPS machine, also in anticipation of a new workload to be added in the future. The workload in the existing logical partition 108 is not growing, nor does the end user want to pay for an increased license capacity. As soon as the added capacity is added to the machine 102, however, WLM cannot manage the logical partition to 400 MIPS because there is nothing to cap the logical partition 108 against. Capping requires the logical partition weight to be something less than the total of all weights in order to be effective. In this scenario, the logical partition would have to be reported back to the license manager 116 as being in exception mode because the specified container size, 400 MIPS, cannot be enforced.

To solve this problem, WLM 112 needs a way to cap a partition 108 at less than the capacity represented by the current partition weight. More particularly, WLM 112 needs something to be able to adjust the denominator in capping/weighting calculations in situations where the logical partition's weight relative to the rest of the machine 102 either cannot be changed (not in an LP cluster), cannot be changed enough (bounded by a minimum or maximum specification or by an LP cluster sum), or does not matter because there are no other logical partitions using shared CPs.

To provide this function the present invention contemplates a new control for LP manager 106 called the partition "phantom weight", or pricing management adjustment weight (PMAW). Each partition 108 has its own phantom weight (entry 408 in FIG. 4) that WLM 112 can set through the use of a hardware instruction. In a sense a partition's phantom weight makes it look to LP manager 106 that a dummy (or phantom) partition 108 exists when capping is turned on for this partition, making the partition's weight a smaller percentage of the machine total weight. This phantom weight acts as an adder to the total logical partition weights only when figuring out the priority of a partition 108 that has been capped by WLM 112. This allows the most flexibility for WLM 112 and guarantees that all WLM-managed partitions 108 with shared processors can be managed to their licensed capacity.

Figure 3:
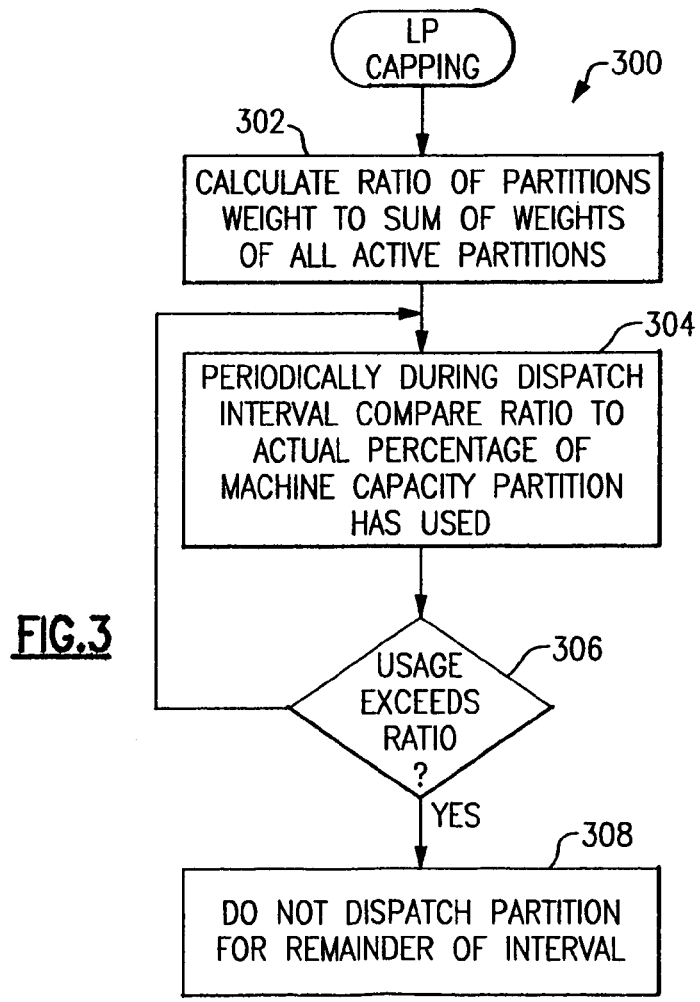
FIG. 3 shows the capping procedure performed by the logical partition manager of the present invention.

To understand how WLM 112 uses the phantom weight it helps to look at how LP manager 106 enforces capping conventionally. FIG. 3 shows at a very high level the capping procedure 300 performed by LP manager 106. Referring to that figure, LP manager 106 enforces capping for a given partition 108 as follows:

1. LP manager 106 calculates the ratio of the partition's weight to the sum of the weights of all active partitions 108 (step 302).
2. Periodically during a dispatch interval, LP manager 106 compares this ratio to the actual percentage of the machine capacity the partition 108 has used (step 304).
3. If the partition's actual usage goes above this ratio (step 306), the partition 108 is not dispatched for the remainder of the dispatch interval (step 308).

In accordance with the present invention, to allow WLM 112 to cap at less than the capacity represented by the current weight, when WLM 112 has capped a partition 108, LP manager 106 adds the partition's phantom weight to the total weight of active partitions 108 in calculating the ratio described above in step 1. For example, consider a 500 MSU machine having a single partition with a weight of 100. If the user sets a soft cap of 400 MSU for this partition 108, WLM 112 sets the partition's phantom weight to 25. The formula for calculating the capacity represented by the weight of a partition 108 capped by WLM 112 with a phantom weight set is:

$$C_{capped}=[\text{Partition\_weight}/(\Sigma \text{ All\_active\_partition\_weights}+\text{Phantom\_weight})]\times\text{Capacity}$$

where $C_{capped}$ is the partition's capped capacity and Capacity is the total capacity potentially available to the partition 108 when it is not being capped (in MSUs or other appropriate unit).

In this example:

$$C_{capped}=100/(100+25)\times 500 \text{ MSUs}=400 \text{ MSUs},$$

where MSUs stands for millions of service units per hour.

WLM 112 only sets a phantom weight for a partition 108 if the partition's soft cap represents less capacity than the partition's current weight. In that case WLM 112 calculates the partition's phantom weight with the formula (see Appendix A for the derivation of this formula):

$$\text{Phantom\_Weight}=[(\text{Partition\_weight}/\text{Soft\_cap})\times\text{Capacity}]-\Sigma \text{ All\_partition\_weights}$$

WLM 112 polls all the inputs to the phantom weight calculation once a minute and if any of these inputs change, WLM 112 recalculates the partition's phantom weight and supplies the new phantom weight to LP manager 106.

The fraction of time a partition 108 needs to have capping turned on can be calculated with the following formula (see Appendix B for the derivation of this formula):

$$P=(C_{uncapped}-C_{softcap})/(C_{uncapped}-C_{capped}),$$

where P is the fraction of time the partition 108 needs to capped; $C_{uncapped}$ is the average capacity used by the partition 108 when it is uncapped; $C_{softcap}$ is the value of the soft cap for the partition 108, and $C_{capped}$ is the average capacity used by the partition 108 when it is capped. If the partition 108 has not been capped recently, the capacity represented by the current weight may be used for this last value.

To decide when to turn on and off capping for a logical partition 108 given the percentage of time the partition 108 should be capped calculated above, WLM 112 creates a "cap pattern" (FIG. 2A). Preferably WLM 112 should not change the state of logical partition capping for a partition 108 on average more frequently than once a minute. In other words, the capping state should not be changed more than 10 times in 10 minutes. The pattern can be represented by two values: the amount of time capping should be turned on and the amount of time capping should be turned off. So if these two values are 30 seconds and 90 seconds, respectively (as shown in FIG. 2A), WLM 112 caps the partition 108 for 30 seconds, turns off capping for 90 seconds and then repeats the pattern. The following table gives the values for the cap on and cap off time based on the total percentage of time the partition should be capped in a preferred embodiment. The values are chosen to keep the number of transitions in the capping state to on average no more than once a minute.

| Percentage of time partition capped (P) | Time cap on (seconds) | Time cap off (seconds) |
| --- | --- | --- |
| P ≦ 5% | 0 | All the time |
| 5% < P ≦ 25% | 30 | 90–570 |
| 25% < P ≦ 50% | 60 | 60–180 |
| 50% < P ≦ 75% | 60–180 | 60 |
| 75% < P < 100% | 90–570 | 30 |
| P = 100% | All the time | 0 |

Figure 6:
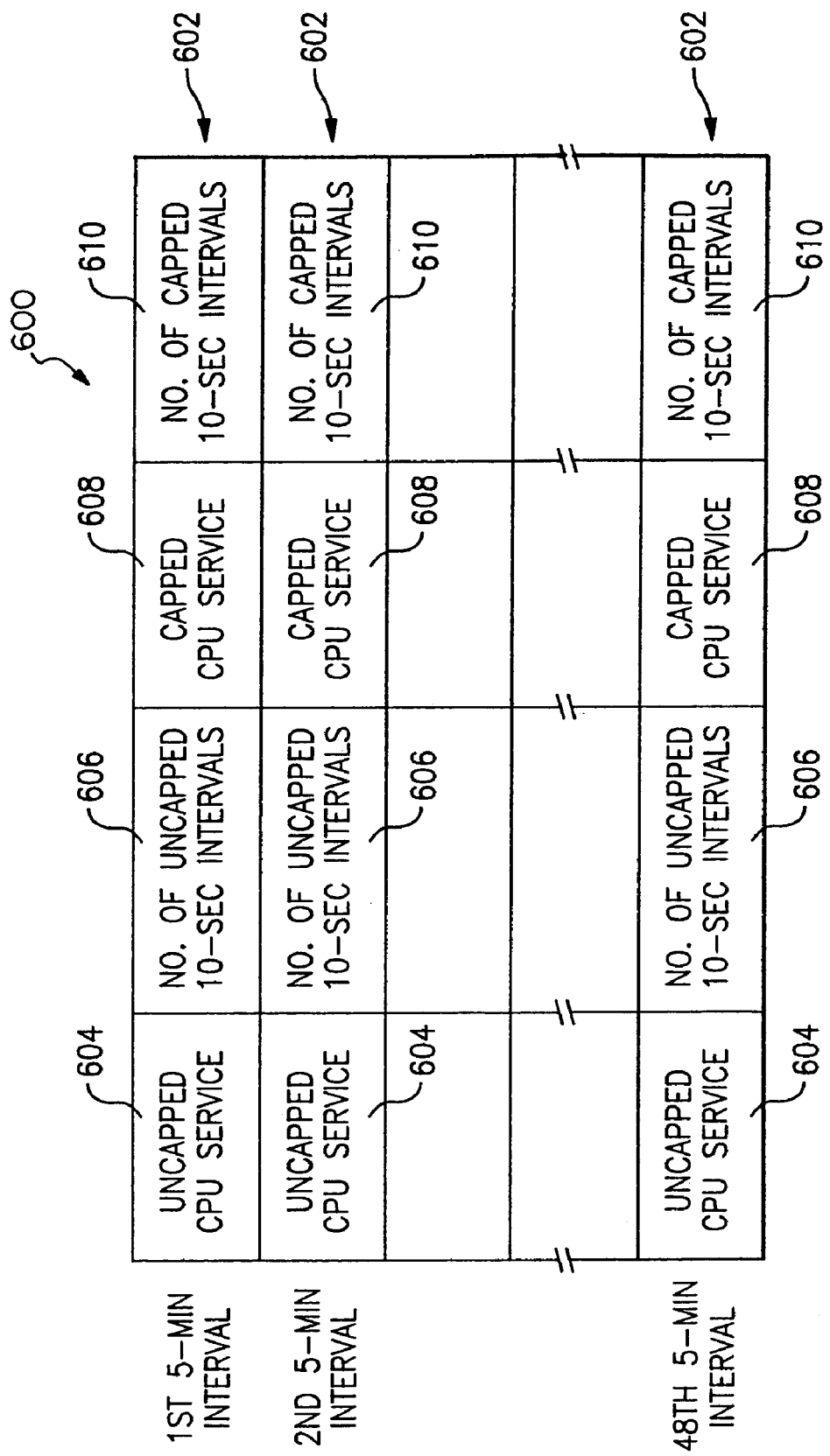
FIG. 6 shows the array used by the workload manager to perform the procedure shown in FIGS. 5A–5C.

WLM 112 enforces the soft cap based on average CPU service rate over 4 hours. To calculate the percentage of time the partition 108 should be capped, the average CPU service rate while capped and the average CPU service rate while uncapped are needed. Referring to FIG. 6, to calculate these averages WLM 112 keeps an array 600 with 48 entries 602 (the number of 5-minute intervals in 4 hours). Each entry contains 4 values:

604 CPU service accumulated in the 5-minute interval when the partition 108 was not capped
606 Number of 10-second intervals in the 5-minute interval that the partition was not capped. This may range between 0 and 30.
608 CPU service accumulated in the 5-minute interval when the partition was capped.
610 Number of 10-second intervals in the 5-minute interval that the partition was capped. This may range between 0 and 30.

Figure 5C:
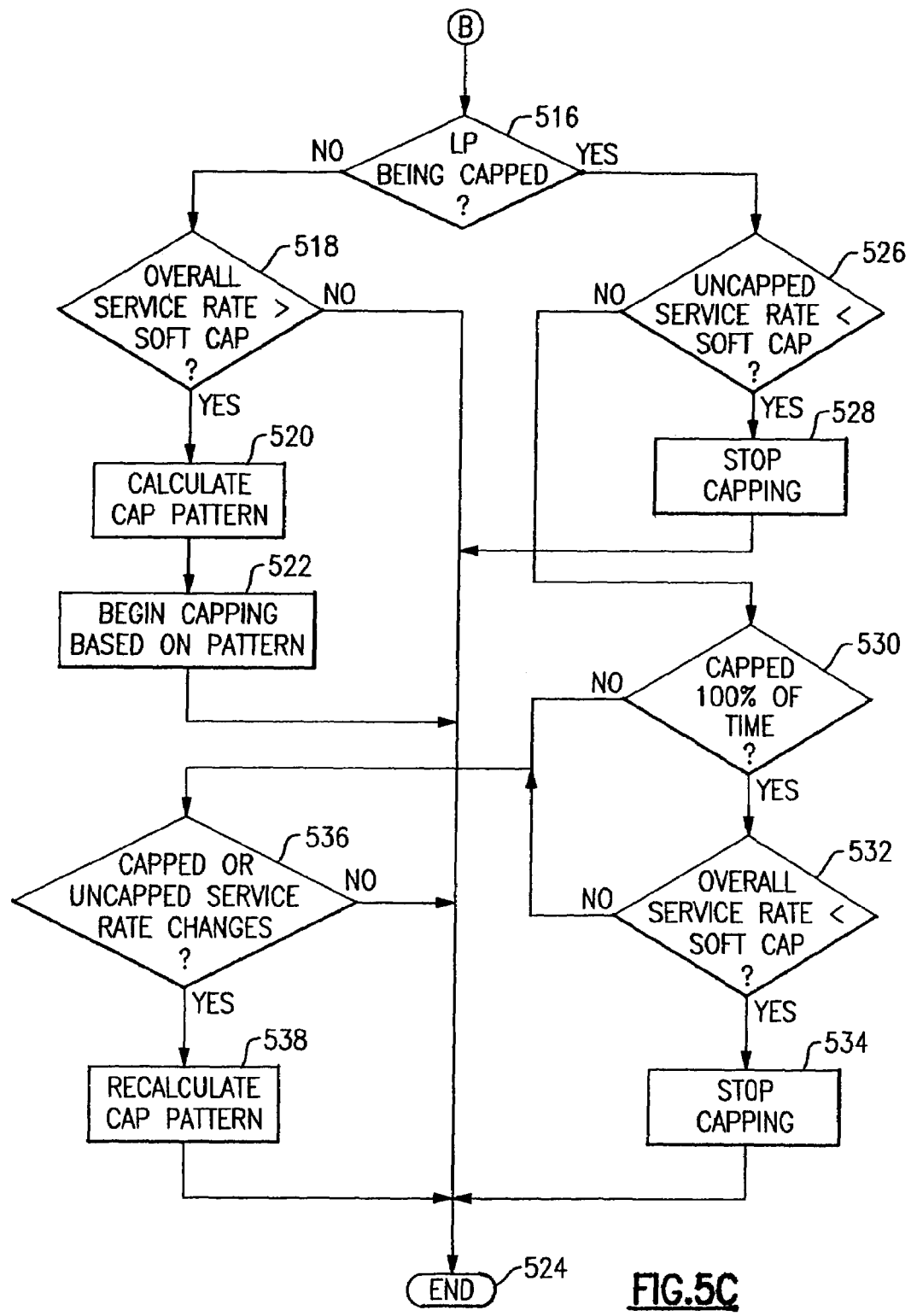

Thus, referring to first FIG. 5A, every 5 minutes WLM 112 initiates a procedure 500 (FIGS. 5A–5C) in which it determines the CPU service 604 accumulated in the previous 5-minute interval while the partition 108 was not capped (step 502), the number 606 of 10-second intervals in the previous 5-minute interval during which the partition 108 was not capped (step 504), the CPU service 608 accumulated in the previous 5-minute interval while the partition 108 was capped (step 506), and the number 610 of 10-second intervals in the previous 5-minute interval during which the partition was capped (step 508). These values 604–610 are stored in the next available row 602 of array 600.

The service units calculated are based on the LP manager 106's view of CPU time accumulated. Therefore, every 10 seconds WLM 112 issues an instruction to LP manager 106. This instruction returns a table of data for each partition. For each partition 108 data is returned for each logical CPU defined. WLM 112 sums the effective dispatch time for each logical CPU of the local partition 108 in which the particular instance of WLM resides. The change in effective dispatch time is used as input to the CPU service calculation.

The service units consumed by the partition 108 are accumulated in the first array entry 602 for the first 5 minutes, the second entry 602 for the second 5 minutes and so on. Once the array 600 is full, the accumulation wraps back to the first entry 602. This way the array 600 always contains the service used over the last 4 hours.

Referring now to FIG. 5B, after determining the values 604–610 for the latest 5-minute interval and updating array 600, WLM 112 calculates the partition's uncapped average CPU service rate (step 510), capped average CPU service rate (step 512), and overall average CPU service rate (step 514). To calculate the average CPU service rate when the partition was not capped ($C_{uncapped}$), WLM 112 divides the total service used when not capped (the sum of all the values 604 in the array 600) by the number of 10-second intervals when the partition was not capped (the sum of all the values 606 in the array 600). To calculate the average CPU service rate when the system was capped ($C_{capped}$), WLM 112 divides the total service used while capped (the sum of all the values 608 in the array 600) by the number of 10-second intervals when the partition was capped (the sum of all the values 610 in the array). To calculate the overall average CPU service rate, WLM divides the total service used over the entire averaging interval (the sum of the all the values 604 and 606 in the array 600) by the number of 10-second intervals in the averaging interval (1440 for a 4-hour averaging interval). Until the system has actually run for 4 hours, only the array entries that have data are used in calculating the average service rates. This avoids calculating averages that are too low when one doesn't have 4 hours worth of data.

When the service unit data is accumulated, the service calculated is adjusted to reflect the MP (multiprocessing) factor for the whole machine instead of the MP factor based on the number of logical CPs in the local partition. This adjustment can be done by multiplying by the ratio of the 1–5 whole machine's MP factor to the partition's MP factor. The MP factor for the whole machine is obtained as part of the calculation of the potential CPU capacity available to the OS/390 image.

Referring to FIG. 5C, based on these averages the following transitions can happen in the state of capping for the partition 108:

1. If the partition 108 is not capped (step 516) and its total average CPU service rate is higher than the soft cap (step 518), the procedure 500 calculates a cap pattern (FIG. 2A) (step 520), begins capping based on the pattern (FIG. 2B) (step 522), and returns to be repeated at the end of the next 5-minute interval (step 524). If the total average CPU service rate is not higher than the soft cap (step 518), the procedure 500 returns without calculating a cap pattern or beginning capping (524).
2. If the partition 108 is being capped (step 516) and its uncapped average CPU service rate is less than the soft cap (step 526), the procedure 500 stops capping (step 528) before returning (step 524).
3. If neither of the above conditions exists, and the partition 108 is being capped 100% of the time (step 530) and its total CPU service rate is less than the soft cap (step 532), the procedure 500 likewise stops capping (step 534) before returning (step 524).
4. If the partition 108 is being capped and neither of the above two conditions exists, but its average capped CPU service rate 608 or its average uncapped service rate 604 changes by a threshold amount (step 536), the procedure 500 recalculates a cap pattern (step 538) before returning (step 524).

If none of these conditions occurs, the procedure 500 simply returns without stopping capping or recalculating a capping pattern (step 524).

If the partition is being capped, the cap pattern is also recalculated for the following events:

1. WLM 112 changes the partition's weight 404 (FIG. 4).
2. The soft cap 408 changes (polled once a minute).

3. The capacity represented by the partition's current weight 404 and phantom weight 406 changes (calculated once a minute).

The WLM weight management algorithm does not raise the weight 404 of a partition 108 above the partition's soft cap 408 when trying to help work on that partition.

Once a minute WLM 112 calculates the total capacity available to the partition 108. If the value has changed from the last minute, license manager 116 is notified. In logical partition mode, WLM 112 also calculates the total machine capacity as an input to the cap pattern calculations described above.

In the disclosed embodiment, machine 102 is operable in either basic mode (in which the machine is not partitioned) or logical partition mode (in which the machine is divided into logical partitions 108). In basic mode WLM 112 calculates the total machine capacity so that it can be returned to the license manager 116. To calculate the total machine capacity, first the CPU rate in service units per second per CPU is calculated. This value is multiplied by the total available CPs and the final result is converted to MSUs. Note that the total machine capacity is based on the total CPs that are potentially available for running work. This includes online CPs and CPs that can be brought online. These steps are:

1. Obtain the count of online CPs and the count of standby CPs that can be varied online. The sum of these two counts is the total available CPU count.
2. If the total available CPU count is greater than the number of currently online CPs, a CPU adjustment factor is calculated based on the total available CPU count. This CPU adjustment factor is calculated by multiplying the current CPU adjustment factor by the current MP factor and dividing by the MP factor for the total CPU count.
   (CPU service units represent a common unit of processor capacity normalized for the speed of a given processor. Unlike CPU time, a CPU service unit represents approximately the same processor capacity regardless of the physical processor speed. The CPU adjustment factor is the normalization value that converts CPU time to CPU service units.)
3. Convert the CPU adjustment factor to service units per second per CPU by dividing 16,000,000 by the CPU adjustment factor (this is the standard formula for calculating service units per second).
4. To get the total machine service units per second rate multiply the service units per second per CPU by the total available CPU count. Multiply this result by 3600 seconds per hour and divide by 1,000,000 to get the total machine MSU capacity.

In logical partition mode both the total machine MSUs capacity and the partition's potential MSU capacity values are needed. The following are the steps to calculate the total machine capacity:

1. Obtain a count of online CPs and those that can be varied online. To get the total available CPs add together the count of configured and standby CPs.
2. Get the physical MP factor.
3. Calculate the physical CPU adjustment factor by multiplying the logical CPU adjustment factor by the ratio of the logical MP factor to the physical MP factor.
4. To calculate the CPU service units per second per CPU divide the 16,000,000 by the physical CPU adjustment factor (this is the standard conversion from CPU adjustment factor to SU/SEC). Save the CPU service units per second value.
5. To calculate machine capacity multiply service units per second per CPU value by the number of physical CPU calculated above. Convert the resulting service units per second value to MSUs (millions of service units per hour) by multiplying by 3600 seconds/hour and dividing by 1,000,000.

To calculate the partition's potential available capacity WLM 112 does the following:

1. Logical partition with a soft cap:
   The partition's capacity equals the soft cap.
2. Logical partition without a soft cap and not explicitly capped:
   Calculate the number of logical CPUs available to the partition by adding the count of configured logical CPUs to the count of standby logical CPUs. Multiply the service units per second calculated above by the number CPUs available to this partition. Convert this result to MSUs by multiplying by 3600 seconds/hour and dividing by 1,000,000. Max result with 1.
3. Explicitly capped logical partition.
   The capacity of the partition is the smaller of calculation 2 and the capacity represented by the partition's weight.

While a particular embodiment has been shown and described, various modifications within the scope of the appended claims will be apparent to those skilled in the art.

Appendix A: Derive Phantom Weight Formula

To derive the formula to calculate the phantom weight start with the formula for calculating the capacity a partition's weight represents. We want the capacity represented by the partition's weight to equal the soft cap.

$$\text{Soft\_cap} = [\text{Partition\_weight}/(\Sigma \text{ All\_partition\_weights} + \text{Phantom\_weight})] \times \text{Capacity}$$

Solve for the Phantom_weight $$\Sigma \text{ All\_partition\_weights} + \text{Phantom\_weight} = (\text{Partition\_weight}/\text{Soft\_cap}) \times \text{Capacity}$$

$$\text{Phantom\_weight} = (\text{Partition\_weight}/\text{Soft\_cap}) \times \text{Capacity} - \Sigma \text{ All\_partition\_weights}$$

Appendix B: Derive Cap Percentage Formula

To derive the formula for calculating the percentage of time a partition should be capped start with the formula for calculating the average CPU capacity used by a partition that is capped a percentage P of the time:

$$C_{avg} = P \times C_{capped} + (1-P) \times C_{uncapped}$$

Solving for P:

$$C_{avg} = P(C_{capped} - C_{uncapped}) + C_{uncapped}$$

$$C_{avg} - C_{uncapped} = P(C_{capped} - C_{uncapped})$$

$$P = (C_{uncapped} - C_{avg})/(C_{uncapped} - C_{capped})$$

Since we want to calculate P when the average CPU capacity equals the soft cap, replace $C_{avg}$ with $C_{softcap}$:

$$P = (C_{uncapped} - C_{softcap})/(C_{uncapped} - C_{capped})$$

What is claimed is:

1. In an information handling system in which a physical machine contains one or more logical partitions, each of which is allocated a defined portion of machine resources and has one or more software applications executing therein, a method of enforcing capacity limitations comprising the steps of:

specifying a maximum allowed consumption of said resources by one of said one or more logical partitions;

measuring an actual consumption of said resources by said logical partition;

comparing said actual consumption with said maximum allowed consumption to determine whether said actual consumption exceeds said maximum allowed consumption; and if said actual consumption exceeds said maximum allowed consumption, reducing said actual consumption of said resources to said maximum allowed consumption by reducing the defined portion of machine resources allocated to said logical partition while allowing all of the one or more software applications executing in said logical partition to continue executing.

2. The method of claim 1 in which said logical partition is one of a group of logical partitions, said maximum allowed consumption being specified as a proportion of the resources available to said group of logical partitions.

3. The method of claim 2 in which each of the logical partitions in said group is assigned a weight, said proportion being defined as the ratio of the weight of said logical partition to the sum of the weights of the logical partitions in said group.

4. The method of claim 3 in which said logical partition is also assigned a phantom weight that is added to said sum of the weights of the logical partitions in said group but not to the weight of said logical partition in determining said ratio.

5. The method of claim 1 in which said group of logical partitions comprises all of the logical partitions on said physical machine.

6. The method of claim 1 in which said specified system resources are processor resources.

7. The method of claim 1 in which said actual consumption is determined as an rolling average of said consumption over a predetermined time interval.

8. A program storage device readable by a machine, tangibly embodying a program of instructions executable by the machine to perform a method of enforcing capacity limitations in an information handling system in which a physical machine contains one or more logical partitions, each of which is allocated a defined portion of machine resources and has one or more software applications executing therein, said method comprising the steps of:

specifying a maximum allowed consumption of said resources by one of said one or more logical partitions;

measuring an actual consumption of said resources by said logical partition;

comparing said actual consumption with said maximum allowed consumption to determine whether said actual consumption exceeds said maximum allowed consumption; and if said actual consumption exceeds said maximum allowed consumption, reducing said actual consumption of said resources to said maximum allowed consumption by reducing the defined portion of machine resources allocated to said logical partition while allowing all of the one or more software applications executing in said logical partition to continue executing.

9. In an information handling system in which a physical machine contains one or more logical partitions, each of which is allocated a defined portion of machine resources and has one or more software applications executing therein, apparatus for enforcing capacity limitations comprising:

means for specifying a maximum allowed consumption of said resources by one of said one or more logical partitions;

means for measuring an actual consumption of said resources by said logical partition;

means for comparing said actual consumption with said maximum allowed consumption to determine whether said actual consumption exceeds said maximum allowed consumption; and means for reducing said actual consumption of said resources to said maximum allowed consumption if said actual consumption exceeds said maximum allowed consumption by reducing the defined portion of machine resources allocated to said logical partition while allowing all of the one or more software applications executing in said logical partition to continue executing.

10. The apparatus of claim 9 in which said logical partition is one of a group of logical partitions, said maximum allowed consumption being specified as a proportion of the resources available to said group of logical partitions.

11. The apparatus of claim 10 in which each of the logical partitions in said group is assigned a weight, said proportion being defined as the ratio of the weight of said-logical partition to the sum of the weights of the logical partitions in said group.

12. The apparatus of claim 11 in which said logical partition is also assigned a phantom weight that is added to said sum of the weights of the logical partitions in said group in determining said ratio.

13. In an information handling system in which a physical machine contains one or more logical partitions, each of which is allocated a defined portion of machine resources, a method of enforcing capacity limitations comprising the steps of:

specifying a maximum capped consumption of said resources by one of said one or more logical partitions;

measuring an actual average consumption of said resources by said logical partition;

comparing said actual average consumption with a maximum average consumption greater than said maximum capped consumption to determine whether said actual average consumption exceeds said maximum average consumption; and if said actual average consumption exceeds said maximum average consumption, reducing said actual average consumption of said resources to said maximum average consumption by alternatingly operating said logical partition in a capped mode in which said logical partition is limited to said maximum capped consumption and in an uncapped mode in which said logical partition is not limited to said maximum capped consumption.

14. The method of claim 13 in which said logical partition is one of a group of one or more logical partitions, said maximum capped consumption being specified as a proportion of the resources available to said group of logical partitions.

15. The method of claim 14 in which each of the logical partitions in said group is assigned a weight, said proportion being defined as the ratio of the weight of said logical partition to the sum of the weights of the logical partitions in said group.

16. The method of claim 15 in which said logical partition is also assigned a phantom weight that is added to said sum of the weights of the logical partitions in said group in determining said ratio.

17. A program storage device readable by a machine, tangibly embodying a program of instructions executable by the machine to perform a method of enforcing capacity limitations in an information handling system in which a physical machine contains one or more logical partitions, each of which is allocated a defined portion of machine resources, said method comprising the steps of:
- specifying a maximum capped consumption of said resources by one of said one or more logical partitions;
- measuring an actual average consumption of said resources by said logical partition;
- comparing said actual average consumption with a maximum average consumption greater than said maximum capped consumption to determine whether said actual average consumption exceeds said maximum average consumption; and
- if said actual average consumption exceeds said maximum average consumption, reducing said actual average consumption of said resources to said maximum average consumption by alternatingly operating said logical partition in a capped mode in which said logical partition is limited to said maximum capped consumption and in an uncapped mode in which said logical partition is not limited to said maximum capped consumption.

18. In an information handling system in which a physical machine contains one or more logical partitions, each of which is allocated a defined portion of machine resources, apparatus for enforcing capacity limitations comprising:
- means for specifying a maximum capped consumption of said resources by one of said one or more logical partitions;
- means for measuring an actual average consumption of said resources by said logical partition;
- means for comparing said actual average consumption with a maximum average consumption greater than said maximum capped consumption to determine whether said actual average consumption exceeds said maximum average consumption; and
- means for reducing said actual average consumption of said resources to said maximum average consumption if said actual average consumption exceeds said maximum average consumption by alternatingly operating said logical partition in a capped mode in which said logical partition is limited to said maximum capped consumption and in an uncapped mode in which said logical partition is not limited to said maximum capped consumption.

19. The apparatus of claim 18 in which said logical partition is one of a group of one or more logical partitions, said maximum capped consumption being specified as a proportion of the resources available to said group of logical partitions.

20. The apparatus of claim 19 in which each of the logical partitions in said group is assigned a weight, said proportion being defined as the ratio of the weight of said logical partition to the sum of the weights of the logical partitions in said group.

21. The apparatus of claim 20 in which said logical partition is also assigned a phantom weight that is added to said sum of the weights of the logical partitions in said group in determining said ratio.

22. In an information handling system in which a physical machine contains one or more logical partitions, each of which is allocated a defined portion of machine resources, a method of enforcing capacity limitations comprising the steps of:
- specifying a maximum capped consumption of said resources by one of said one or more logical partitions, said logical partition being one of a group of one or more logical partitions, said maximum capped consumption being specified as a proportion of the resources available to said group of logical partitions, each of the logical partitions in said group being assigned a weight, said proportion being defined as the ratio of the weight of said logical partition to the sum of the weights of the logical partitions in said group, said logical partition also being assigned a phantom weight that is added to said sum of the weights of the logical partitions in said group but not to the weight of said logical partition in determining said ratio;
- measuring an actual average consumption of said resources by said logical partition;
- comparing said actual average consumption with a maximum average consumption to determine whether said actual consumption exceeds said maximum average consumption; and
- if said actual average consumption exceeds said maximum average consumption, reducing said actual average consumption of said resources to said maximum average consumption by operating said logical partition at least part of the time in a capped mode in which said logical partition is limited to said maximum capped consumption.

23. A program storage device readable by a machine, tangibly embodying a program of instructions executable by the machine to perform a method of enforcing capacity limitations in an information handling system in which a physical machine contains one or more logical partitions, each of which is allocated a defined portion of machine resources, said method comprising the steps of:
- specifying a maximum capped consumption of said resources by one of said one or more logical partitions, said logical partition being one of a group of one or more logical partitions, said maximum capped consumption being specified as a proportion of the resources available to said group of logical partitions, each of the logical partitions in said group being assigned a weight, said proportion being defined as the ratio of the weight of said logical partition to the sum of the weights of the logical partitions in said group, said logical partition also being assigned a phantom weight that is added to said sum of the weights of the logical partitions in said group but not to the weight of said logical partition in determining said ratio;
- measuring an actual average consumption of said resources by said logical partition;
- comparing said actual average consumption with a maximum average consumption to determine whether said actual consumption exceeds said maximum average consumption; and
- if said actual average consumption exceeds said maximum average consumption, reducing said actual average consumption of said resources to said maximum average consumption by operating said logical partition at least part of the time in a capped mode in which said logical partition is limited to said maximum capped consumption.

24. In an information handling system in which a physical machine contains one or more logical partitions, each of which is allocated a defined portion of machine resources, apparatus for enforcing capacity limitations comprising:
- means for specifying a maximum capped consumption of said resources by one of said one or more logical partitions, said logical partition being one of a group of one or more logical partitions, said maximum capped consumption being specified as a proportion of the resources available to said group of logical partitions, each of the logical partitions in said group being assigned a weight, said proportion being defined as the ratio of the weight of said logical partition to the sum of the weights of the logical partitions in said group, said logical partition also being assigned a phantom weight that is added to said sum of the weights of the logical partitions in said group but not to the weight of said logical partition in determining said ratio;

means for measuring an actual average consumption of said resources by said logical partition;

means comparing said actual average consumption with a maximum average consumption to determine whether said actual consumption exceeds said maximum average consumption; and means for reducing said actual average consumption of said resources to said maximum average consumption if said actual average consumption exceeds said maximum average Consumption by operating said logical partition at least part of the time in a capped mode in which said logical partition is limited to said maximum capped consumption.

* * * * *